United States Patent Office 3,152,814
Patented Oct. 13, 1964

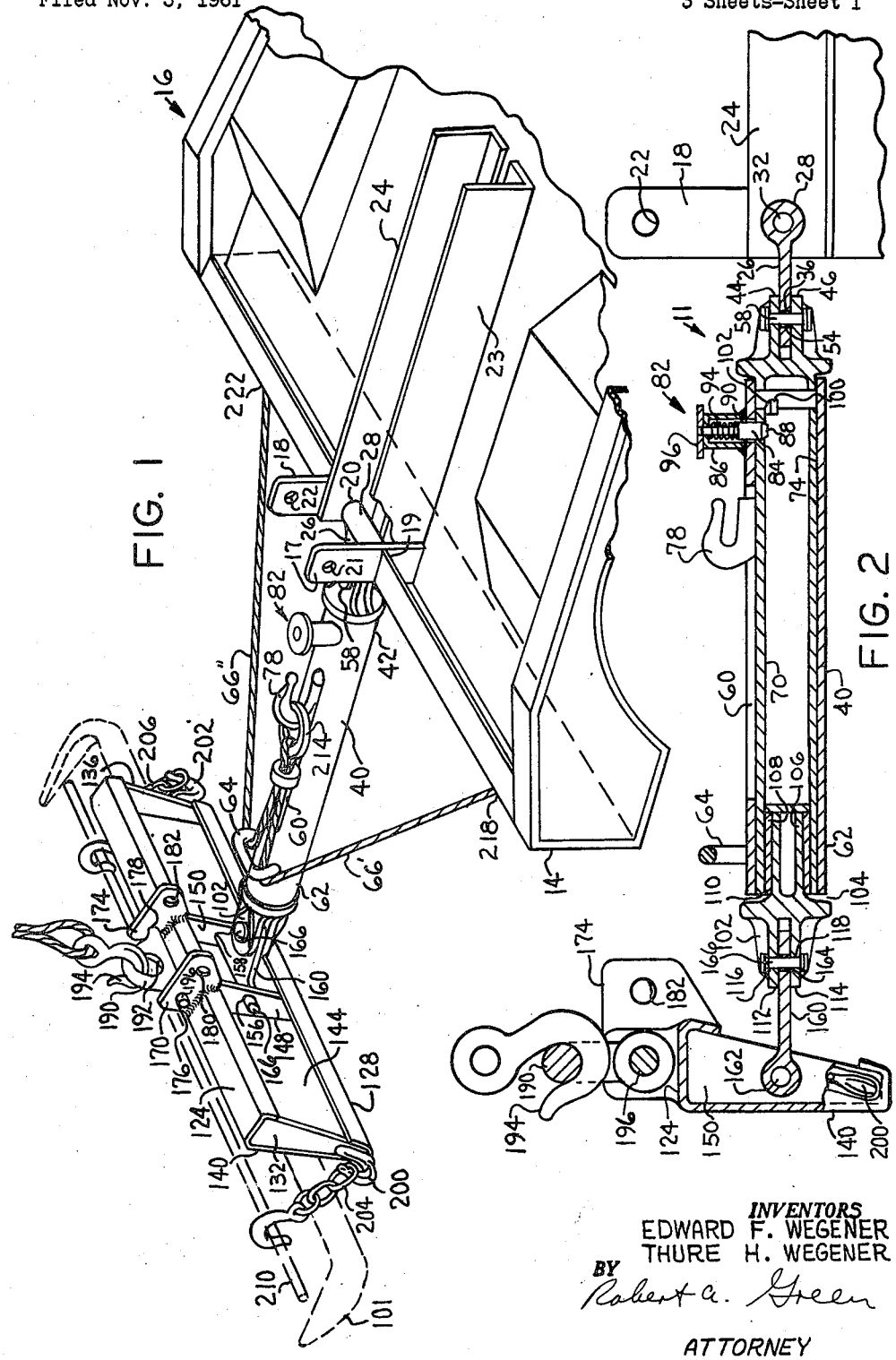

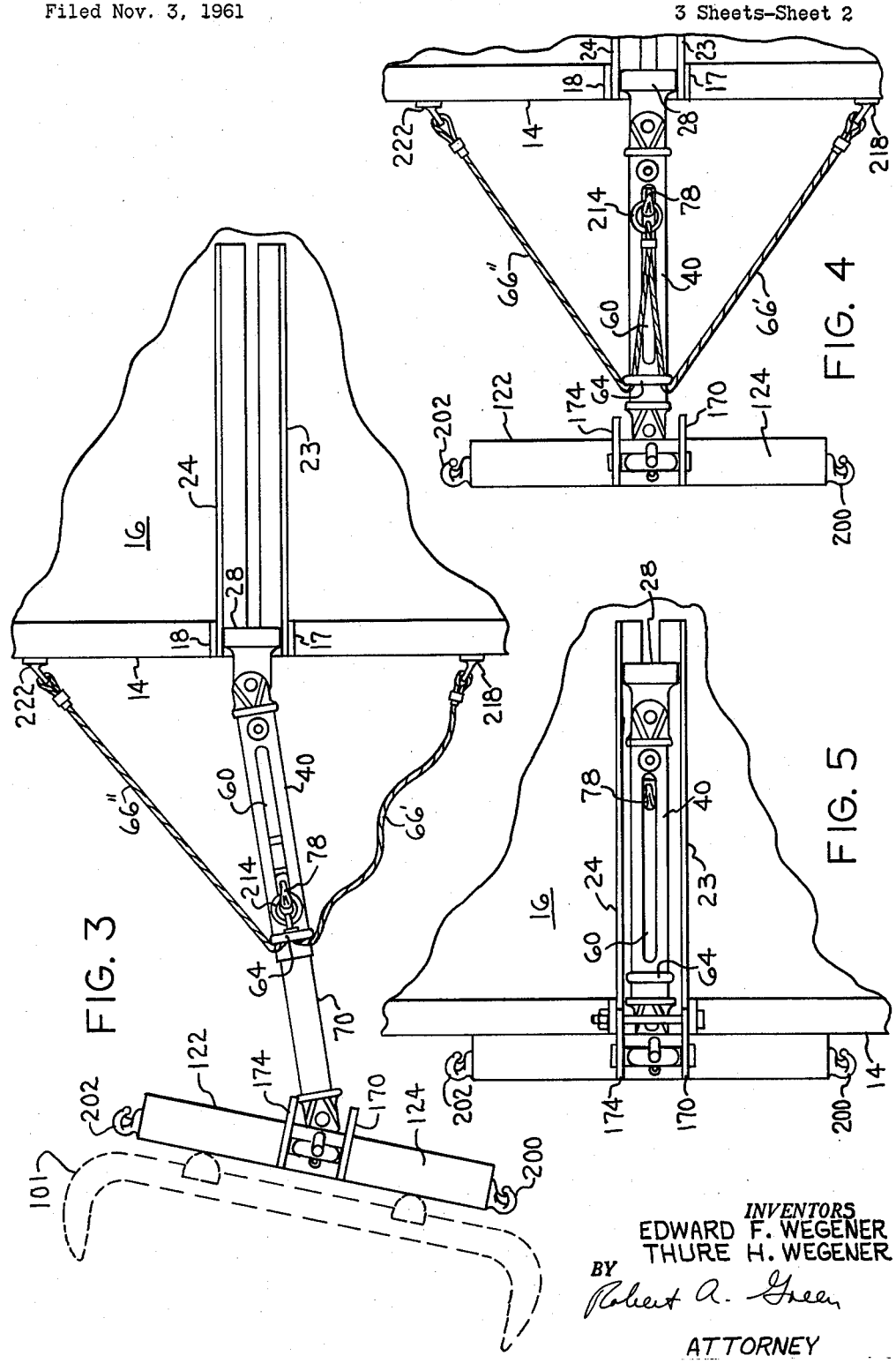

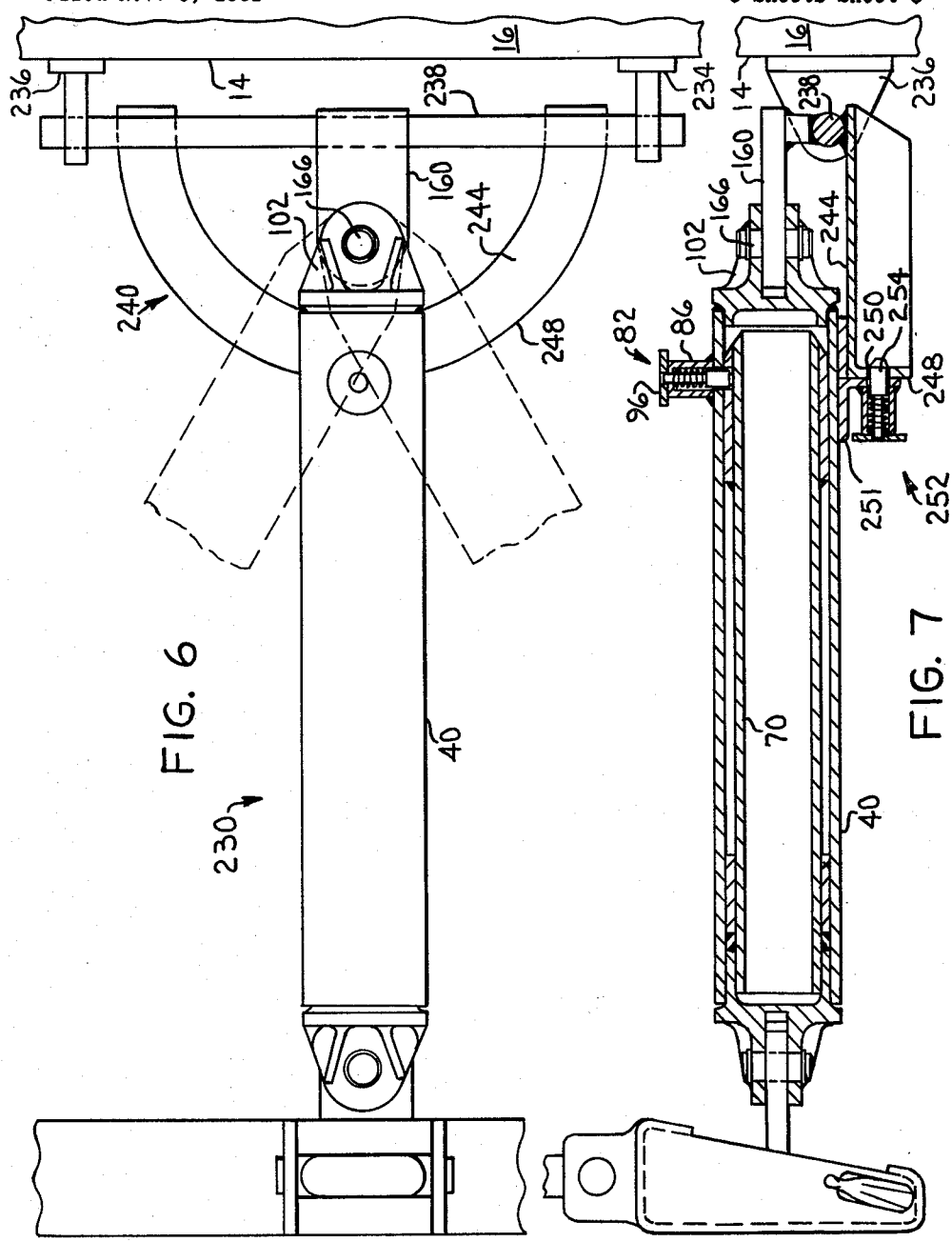

3,152,814
VEHICLE TOWING DEVICES
Edward F. Wegener and Thure H. Wegener, both of Matawan Road, Laurence Harbor, N.J.
Filed Nov. 3, 1961, Ser. No. 150,087
10 Claims. (Cl. 280—479)

This invention relates to vehicle towing devices known as tow bars.

At the present time, there are several types of tow bars commercially available for use in raising and towing wrecked or disabled vehicles. However, these tow bars operate most satisfactorily when the towing vehicle is axially aligned with the vehicle being towed. When the towing and towed vehicles are considerably out of alignment, such known tow bars do not operate satisfactorily.

Accordingly, the principles and objects of the present invention are directed toward the provision of an improved tow bar for use in lifting a disabled vehicle, the tow bar operating effectively when the lifting and disabled vehicles are in alignment or out of alignment.

Briefly, the apparatus of the invention includes a pair of telescoping members slidable with respect to each other and adapted to be coupled, one to the disabled vehicle to be lifted (the "wreck") and one to the lifting vehicle (the "wrecker"). Means are provided for applying a lifting force to one of the telescoping members and thus causing the disabled vehicle to be lifted. As the disabled vehicle is lifted, the two members are telescoped together, and, at the same time, said means causes the telescoping members to rotate about an axis and thus pull the disabled vehicle and the lifting vehicle into alignment.

The invention is described in greater detail by reference to the drawing wherein:

FIG. 1 is a perspective view of a tow bar embodying the invention and portions of a wreck and wrecker with which it is employed;

FIG. 2 is a sectional view of the tow bar shown in FIG. 1;

FIG. 3 is a plan view of the tow bar of the invention in one position of operation;

FIG. 4 is a plan view of the tow bar of the invention in another position which it assumes during its operation;

FIG. 5 is a view of a portion of the tow bar of the invention as it appears when not in use and when stored on its tow truck;

FIG. 6 is a plan view of a portion of a modification of the invention; and

FIG. 7 is a sectional view of the apparatus of FIG. 6.

Referring to FIGS. 1 and 2, a tow bar 10 embodying the invention is secured to the tail gate 14 or other suitable portion of the rear of a tow truck or wrecker 16. The tow bar has a front end 11 which is coupled to the wrecker 16 and a rear end 12 which is adapted to be coupled to a disabled vehicle or "wreck." Many different arrangements may be used to secure the tow bar to the tail gate, and one such arrangement shown and described herein includes means for securing the tow bar to the wrecker and means for storing the tow bar when it is not in use. In the illustrated arrangement, a pair of parallel, upright plates 17 and 18 are spaced apart and secured to the top of the tail gate 14. The plates are spaced apart a distance sufficient to allow the tow bar 10 to pass between them. The plates are provided with a first pair of aligned apertures 19 and 20 and a second pair of aligned apertures 21 and 22 positioned vertically above the first pair. A pair of L-shaped brackets 23 and 24 are secured to the tail gate or the wrecker body in any suitable manner, and they extend forwardly away from the tail gate toward the front of the wrecker. The brackets are suitably spaced apart so that they can receive and store the tow bar when it is not in use.

The tow bar 10 is coupled to the upright plates 17 and 18 by means of a metal mounting plate 26 which has a hollow tubular portion 28 which is positioned between the plates 17 and 18 and is aligned with apertures 19 and 20. A removable pin 32 passed through the apertures 19 and 20 and the tubular portion 28 holds the plate 26 in position. The plate 26 is rotatable about pin 32 as a center. The plate 26 is also provided with an aperture 36, by means of which it is attached to another member to be described.

The tow bar 10 includes a first member 40 which is in the form of a hollow cylindrical elongated tube having at one end 42 means for securing it to the mounting plate 26. This means comprises a pair of spaced-apart plates 44 and 46 having aligned apertures 50 and 54. The plate 26 is placed between the plates 44 and 46 with aperture 36 aligned with apertures 50 and 54, and a suitable locking pin 58 or bolt or the like is secured in the aligned apertures. Thus, the first tubular member 40 is rotatable both vertically about the pin 32 as an axis and substantially horizontally about the pin 58 as an axis.

The tubular member 40 is also provided with a slot 60 which extends along a considerable portion of the length of its wall, preferably in its upper portion so that it is accessible to the user of the tow bar from above. At the other end 62 of the tubular member 40 remote from the end 42, the tube 40 is provided on its outer and upper surface with a ring 64 which is axially aligned with the slot 60. The ring is positioned between the end 62 of member 40 and the adjacent end of slot 60. The ring 64 serves to guide a cable or chain 66 for a purpose to be described.

The tow bar 10 also includes a second member 70 slidably telescoped within the first tubular member 40. The second member may be, and is, preferably cylindrical in form and is designed to slide readily into and out of the first tube 40. The second member includes one end 74 which lies within the first tube and which carries a hook 78 or the like for engagement with the cable 66. The hook 78 is secured to the outer surface of member 70 and extends through and is accessible through the slot 60 in the first tube 40. The hook 78 is thus axially aligned and in operative relation with the ring 64 on the outer member 40.

Locking means 82 is provided for locking the outer and inner members together when member 70 is completely inserted within member 40. The locking means includes a piston 84 disposed within a cylinder 86 secured to the outer surface of the member 70 immediately adjacent to its end 42. The piston has a tapered front end 88 which extends through an aperture 90 in the member 40 and into an aperture 92 in member 70 whereby the two members are locked together. A spring 94 surrounds the piston inside the cylinder 86 and urges the piston 84 into the locking position in which it penetrates both apertures 90 and 92. A knob or handle 96 is secured to the piston outside the cylinder 86 whereby the piston may be withdrawn from the locking position.

The front end 74 of the inner member 70 is provided with a projecting member 100 having a tapered leading edge 102 which is positioned to engage the tapered end 88 of the locking piston as the inner member 70 is moved into the outer member 40. The projecting member 10 forces the piston 84 upwardly, and, as the inner member continues to move into the outer member, the apertures 90 and 92 come into alignment and the locking piston 84 springs into both apertures and locks the inner and outer members together.

The inner member 70 is provided with attaching means whereby it and the tow bar 10 may be coupled to a vehicle or wreck 101 to be raised and towed. This means includes, as one portion, a bracket 102 rotatably positioned within the open end 104 of the inner cylinder 70. The bracket 102 includes a cylindrical portion 106 which is positioned within the member 70, and it further includes an enlarged flange 108 which engages a ring 110 secured inside the open end of member 70. The ring 110 retains the bracket 102 within the member 70 and allows the bracket to rotate freely. The bracket 102 also includes a pair of spaced-apart plates 112 and 114 having aligned apertures 116 and 118, by means of which it may be rotatably secured to a second portion of the attaching means.

The aforementioned second portion of the attaching means is the portion by means of which the tow bar 10 is directly connected to the vehicle to be raised. This means comprises a lift plate 122 having a wide top edge 124 and a narrower bottom edge 128 and side plates 132 and 136. The lift plate includes an outer surface 140 and an inner surface 144. On the inner surface of the lift plate and near its center are secured a pair of parallel ribs 148 and 150 which are spaced apart and which are provided with aligned apertures 156 and 158. A plate 160 is provided including a shaft-like portion 162 rotatably inserted in the apertures 156 and 158 in the ribs 148 and 150. The plate 160 is also provided with an aperture 164. The plate 160 is positioned between the plates 112 and 114 of the bracket 102 so that the apertures 164, 116 and 118 are aligned and a suitable locking pin 166 is inserted therein and locked in place so that the inner member 70 is thus secured to the lift plate 122. The locking pin 166 represents the center of rotation horizontally for the inner member 70 of the tow bar 10.

On the top edge 124 of the lift plate 122 are provided a pair of brackets 170 and 174 spaced apart about the center of the lift plate 122. The brackets 170 and 174 are irregularly shaped and include a portion extending vertically above the top edge 124 of the lift plate and another portion which extends rearwardly a short distance toward the vehicle 16. The brackets 170 and 174 include a first pair of horizontally aligned apertures 176, 178 which lie directly above the top edge 124 of the lift plate and a second pair of horizontally aligned apertures 180 and 182 which lie rearwardly of the apertures 176 and 178 and approximately above bracket 102. A bracket 190, having an aperture 192 which is adapted to be engaged by a lifting hook 194, is secured to the brackets 170 and 174 by means of a shaft-like portion 196 which is rotatably inserted in the pair of apertures 176 and 178. The hook 194 is coupled to a suitable crane (not shown) mounted on the wrecker 16. The pair of apertures 180 and 182 are used in storing the tow bar, as described below.

A pair of hooks 200 and 202 are secured to the side plates 132 and 136 of the lift plate 122. The axes of the hooks 200 and 202 are oriented at an acute angle with respect to the plane of the front surface 140 of the lift plate 122 so that they face away from the wreck 101 and toward the wrecker 16. The hooks 200 and 202 are adapted to be coupled to a suitable portion 210 of the wreck by means of chains 204 and 206, and the orientation of the hooks 200 and 202 insures that the chains 204 and 206 will not become disengaged during the operation.

The tow bar of the invention also includes the cable or chain 66 which is secured in any suitable manner at its center to the hook 78 on the inner member 70. If a link chain 66 is employed, the links may be large enough to secure the center of the chain to hook 62. Alternatively, whether a chain, cable or other means is used, a ring 214 may be secured to the center of the cable and the ring engages the hook 62. The cable 66 thus is effectively separated into two operating halves 66' and 66" which extend from the hook forwardly and are threaded through the ring 64. After the cable halves 66' and 66" have been threaded through the ring 64, they are separated and directed rearwardly toward the wrecker and the ends 218 and 222 thereof are spaced apart a suitable distance and secured to the tail gate 114 of the wrecker 16 in any suitable manner. The cable 66 is of sufficient length so that when the member 70 is completely inserted in member 40, the two halves 66' and 66" of the cable have some slack in them.

In operation of the invention, referring to FIGS. 3 and 4, the wrecker 16 is backed up to the wreck to be raised and towed, and it is assumed that conditions prevent the wrecker from being axially aligned with the wreck. Thus, the wreck 101 and wrecker 16 are oriented at an angle to each other, as illustrated by the portions thereof shown in FIG. 3. The spring lock 82 on the tow bar 10 is then released, and the inner member 20 is withdrawn from the member 40 sufficiently so that the surface 140 of lift plate 122 bears against the bumper or other forward portion of the wreck. The tow bar is suitably rotated about pin 58, and the lift plate is suitably rotated through bracket 102 to effect this initial adjustment. The chains 204 and 206 are then secured to a suitable portion of the frame 210 of the wreck. With the tow bar thus adjusted for the misalignment of the wreck and the wrecker, the two halves of the cable 66 are unbalanced, and one half 66' is taut or almost taut and the other half 66" is quite slack. As the crane (not shown) coupled to bracket 190 lifts the tow bar and the wreck, the inner tube 70 slides into the outer tube 40. As the tow bar is raised and the tubes 70 and 40 telescope together, the front end of the wreck is raised and the wreck is pulled toward the wrecker. At the same time as this telescoping movement of tubes 70 and 40 occurs, the hook 78 pulls the ring 64 and the center of the cable 66 forwardly and draws the cable half 66' taut. As this telescoping movement continues, the taut cable half 66' applies a lateral force on the tow bar and, as the wreck is raised, the lateral force on the two bar causes the two bar to rotate about the pin 58 as a center until the two halves of the cable are balanced. As the tow bar rotates, the wreck is brought into alignment with the wrecker and, as the wreck thus moves, the lift plate 122 of the tow bar accommodates through rotatable bracket 102. As the lifting operation approaches completion and member 70 moves into member 40, the projecting member 100 raises the spring piston 84 which later drops into the aligned apertures 90 and 92 and locks members 70 and 40 together.

After the desired towing operation has been completed and the tow bar 10 has been removed from the wreck, the tow bar may be stored on the wrecker. To this end, the pin 32 is removed from the bracket 26 and plates 17 and 18, and the tow bar is pushed forwardly on the brackets 23 and 24 as a track until the lift plate 122 abuts the tail gate 14 (FIG. 5). In this position of the tow bar, the apertures 180 and 182 in the brackets 170 and 174 are aligned with the apertures 21 and 22 in the plates 17 and 18 and the pin is inserted in these aligned apertures. The tow bar is thus locked in its retracted position.

A tow bar 230 embodying a modification of the invention does not utilize the chain 66 of the tow bar 10 but includes other means for providing the desired rotation of the tow bar. The tow bar 230 is identical to the tow bar 10 except that the cable 66, ring 64, and hook 78 are omitted and the means for securing the tow bar to the wrecker is different. Accordingly, only a portion of the tow bar itself is shown in FIGS. 6 and 7, along with the modified attaching means which includes a pair of bearing blocks 234 and 236 which are spaced apart on a horizontal axis and are secured to the tail gate 14 of tow truck 16. A shaft 238 is rotatably positioned in the bearing blocks. An arcuate plate 240 including a horizontal portion 244 and a vertical portion 248 transverse thereto is secured to the shaft and thus rotates with the shaft about the axis of the shaft. An aperture 250 is provided in the vertical portion of the arcuate plate and at approximately its center. The tow bar 230 includes bracket 102 and plate 160 coupled together by pin 166 as in tow bar 10, with plate 160 being welded or otherwise secured to shaft 238. The tow bar is also secured to the top surface of portion 244 of plate 240 and may include an auxiliary bracket 251 for making this connection. A vertical portion of bracket 251 is provided with a conventional spring lock device 252 similar to the device 82 and including a spring controlled plunger 254 which is adapted to extend into the aperture 250 in portion 248.

In operation of this embodiment of the invention, when it is desired to couple the towing vehicle to a vehicle to be towed, the member 70 is withdrawn from member 40 and spring lock 252 is released and the necessary adjustment of the tow bar is made by rotating it vertically and horizontally about the pin 166 and shaft 238. The tow bar is then coupled to the vehicle to be towed, and the vehicle is raised. As the vehicle is raised, the inner member 70 slides into the outer member 40 and the vehicle is drawn into alignment with the towing vehicle. As this realignment occurs, the tow bar moves upwardly about the shaft 238 and horizontally about the pin 166 until ultimately the locking plunger 254 engages the aperture 250 in the plate 248. The alignment operation has now been completed, and the vehicle is ready to be towed.

The principles underlying the operation and construction of the invention will be clear to those skilled in the art from the foregoing description. It is obvious that modifications may be made in many of the specific features described while coming within the spirit and scope of the invention.

What is claimed is:

1. A vehicle tow bar including a two-part telescoping means adapted to be coupled one part to a towed vehicle and the other to a towing vehicle, the axis of the two vehicles and the tow bar being permissibly out of alignment with each other, aligning means having one portion adapted to be secured to said towing vehicle and another portion adapted to be secured to said one part of said telescoping means and at the same time having a portion in contact with and movable with respect to the other part of said telescoping means, said aligning means including a cable secured at about its center to said one part of said telescoping means and thus forming two halves the ends of which are adapted to be secured to the towing vehicle, the two halves of said cable being under different degrees of tension, said center of said cable being adapted to move with said one part so that when said one part moves into said other part of said telescoping means from an external position, the cable tends to equalize the tension in its halves and draws the towed vehicle into alignment with the towing vehicle, and guide means on said other part for guiding the cable as it moves and readjusts its halves.

2. A vehicle tow bar including a two-part telescoping means adapted to be coupled one part to a towed vehicle and the other to a towing vehicle, the axis of the two vehicles and the tow bar being permissibly out of alignment with each other, aligning means having one portion adapted to be secured to said towing vehicle and another portion adapted to be secured to said one part of said telescoping means and at the same time having a portion in contact with and movable with respect to the other part of said telescoping means, said aligning means including a cable secured at about its center to said one part of said telescoping means and thus forming two halves the ends of which are adapted to be secured to the towing vehicle, the two halves of said cable being under different degrees of tension, said center of said cable being adapted to move with said one part, a guide loop on said other part of said telescoping means, said cable being in contact with and extending through said guide loop, said guide loop guiding the cable as it moves with said one part so that when said one part moves into said other part of said telescoping means from an external position, the cable tends to equalize the tension in its halves and draws the towed vehicle into alignment with the towing vehicle.

3. A vehicle tow bar including a pair of telescoping members slidable with respect to each other with one member inside the other, one member having bracket means for coupling it to a towing wrecker and the other member having bracket means for coupling it to a wreck vehicle to be raised and towed, both said bracket means being rotatable so that said tow bar may be angularly adjusted with respect to the wrecker and to the wreck so that it may be secured to the wreck when the wreck is out of alignment with the wrecker, said telescoping members being drawn apart when the tow bar is first coupled to a wreck, said tow bar also including means for drawing the wreck into alignment with the wrecker as the wreck is raised and the pair of members are telescoped together, said last-named means including a cable secured at its midpoint to the inner member of the two telescoping members and having its ends adapted to be secured to a wrecker, a guide ring on the outer member of the two telescoping members, the two halves of the cable passing through the guide ring from the area of connection to the inner member, the two halves of the cable being in different states of tension due to the misalignment of the wreck and the wrecker, the difference in tension in the cable halves causing a force to be exerted on the wreck which brings the wreck into alignment with the wrecker as the wreck is raised and the telescoping members are brought together.

4. A tow bar adapted to be coupled between a wrecker and a wreck whereby said wrecker can raise, align and tow said wreck, comprising a two-part member including a first member adapted to be secured to a wrecker and a slidable second member adapted to be secured to a wreck, said second member being slidably coupled to said first member, a fixed guide member secured to said first member and adapted to have aligning forces applied thereto, and aligning means having one portion secured to and movable with said slidable second member, said aligning means having other portions adapted to be secured to a wrecker whereby said aligning means is adapted to extend between said second member and the wrecker and aligning forces may thus be set up in said aligning means by the wrecker, said aligning means also engaging said fixed guide member and applying aligning forces thereto as the second member moves relative to said first member, the aligning force present in said aligning means and applied to said fixed guide member being determined by the degree of misalignment of the wreck and the wrecker, the aligning force being applied to said fixed guide member and thus to the tow bar and to the wreck as the tow bar lifts the wreck and the second member moves with respect to the first member.

5. A tow bar adapted to be coupled between a wrecker and a wreck whereby said wrecker can raise, align and tow said wreck, comprising a two-part member including a first member having rotatable securing means adapted to be secured to a wrecker and a slidable second member having rotatable securing means adapted to be secured to a wreck, said second member being telescopically slidably coupled to said first member, a fixed guide member secured to said first member and adapted to have aligning forces applied thereto, and aligning means having a portion secured to and movable with said slidable second member, said aligning means having other portions adapted to be secured to a wrecker whereby said aligning means is adapted to extend between said second member and the wrecker and aligning forces may thus be set up in said aligning means by the wrecker, said aligning means also engaging said fixed guide member and applying aligning forces thereto as the second member slides telescopically with respect to said first member, the aligning force present in said aligning means and applied to said fixed guide member being determined by the degree of misalignment of the wreck and the wrecker, the aligning force being applied to said fixed guide member and thus to the tow bar and to the wreck as the tow bar lifts the wreck and the second member moves with respect to the first member.

6. A tow bar adapted to be coupled between a wrecker and a wreck whereby said wrecker can raise, align and tow said wreck, comprising a two-part member including a first member adapted to be secured to a wrecker and a slidable second member adapted to be secured to a wreck, said second member being slidably coupled to said first member, a fixed guide member secured to said first member and adapted to have aligning forces applied thereto, and aligning means having a portion secured to and movable with said slidable second member, said aligning means having a plurality of separate portions engaging said fixed guide member and adapted to be secured to the wrecker whereby said separate portions extend from said second member along their area of engagement with said fixed guide member to the wrecker, said separate portions being adapted to apply aligning forces to said guide member in different directions depending on the angle of misalignment of a wreck and a wrecker, the aligning force present in said aligning means and applied to said fixed guide member being determined by the degree of misalignment of the wreck and the wrecker, the aligning force being applied to said fixed guide member and thus to the tow bar and to the wreck as the tow bar lifts the wreck and the second member moves with respect to the first member.

7. The tow bar defined in claim 6 wherein said aligning means comprises a flexible cable secured at about its center to said second member and thus being divided into two portions each of which engages said fixed guide member and extends therefrom in a different direction with each of the two portions being adapted to have its end secured to a wrecker, each of the two portions thus being able to apply an aligning force in a different direction to said fixed guide member and thus to the tow bar.

8. A tow bar adapted to be coupled between a wrecker and a wreck whereby said wrecker can raise, align and tow said wreck, comprising a two-part member including a first member having a rotatable end portion adapted to be secured to a wrecker and a slidable second member having a rotatable end portion adapted to be secured to a wreck, said first and second members being axially aligned and the end portion of said first member being remote from the end portion of said second member, said second member being slidably telescoped within said first member, said second member being drawn out of said first member when it is to be coupled to a wreck, said second member sliding into said first member as the tow bar and a wreck are raised, a fixed guide means secured to said first member and adapted to have aligning forces applied thereto, said fixed guide means being positioned between said end portions of said first and second members, aligning means secured to said slidable second member at a position which lies between said guide means and the end portion of said first member and engaging and applying pressure to said guide means in an amount related to the misalignment of the wreck and the wrecker whereby said aligning means can exert an aligning force on said guide means and on said wreck as the wreck is raised and the first member and second member telescope together, said aligning means comprising a flexible cable secured at about its center to said second member and thus being divided into two portions, each of said portions engaging said fixed guide member and extending therefrom in a different direction, each of the two portions being adapted to have its end secured to a wrecker, each of the two portions thus being able to apply an aligning force in a different direction to said fixed guide member and thus to the tow bar.

9. A tow bar adapted to be coupled between a wrecker and a wreck which are out of alignment whereby said wrecker can raise, align and tow said wreck, comprising a two-part member including a first member having a rotatable end portion adapted to be secured to a wrecker and a slidable second member having a rotatable end portion adapted to be secured to a wreck, said first and second members being axially aligned, with said second member being telescopically slidable within said first member, the end portion of said first member being remote from the end portion of said second member with the telescoping portions of said members lying between said end portions, said second member being drawn out of said first member when it is to be coupled to a wreck, said second member sliding into said first member as a wreck is raised, a fixed guide means secured to said first member and adapted to have aligning forces applied thereto, said fixed guide means being positioned between said end portions of said first and second members, aligning means secured to said slidable second member at a point of attachment which lies between said guide means on said first member and the end portion of said first member, said aligning means comprising a flexible cable secured at about its center to said second member and thus being divided into two portions, each of said portions engaging said fixed guide member and extending therefrom in a different direction, each of the two portions being adapted to have its end secured to a wrecker, each of the two portions thus being able to apply an aligning force in a different direction to said fixed guide member and thus to the tow bar.

10. A tow bar adapted to be coupled between a wrecker and a wreck which are out of alignment whereby said wrecker can raise, align and tow said wreck, comprising a two-part member including a first member having a rotatable end portion adapted to be secured to a wrecker and a slidable second member having a rotatable end portion adapted to be secured to a wreck, said first and second members being axially aligned, with said second member being telescopically slidable within said first member, the end portion of said first member being remote from the end portion of said second member, said second member being drawn out of said first member when it is to be coupled to a wreck, said first member rotating with respect to its end portion an amount related to the misalignment of the wreck and the wrecker as said second member is coupled to a wreck, said second member sliding into said first member as the wreck is raised, a fixed guide means secured to said first member and adapted to have aligning forces applied thereto, said fixed guide means being positioned between said end portions of said first and second members, aligning means secured to said slidable second member at a point of attachment which lies between said guide means on said first member and the end portion of said first member, said aligning means comprising a flexible cable secured at about its center to said second member and thus being divided into two portions, each of said portions engaging said fixed guide member and extending therefrom in a different direction, each of the two portions being adapted to have its end secured to a wrecker, each of the two portions thus being able to apply an aligning force in a different direction to said fixed guide member and thus to the tow bar.

References Cited in the file of this patent
UNITED STATES PATENTS

| | | |
|---|---|---|
| 2,555,663 | Schouboe | June 5, 1951 |
| 2,582,153 | Ostrander | Jan. 8, 1952 |
| 2,795,435 | Ortiz | June 11, 1957 |